(12) United States Patent
Ahmed et al.

(10) Patent No.: US 10,938,250 B2
(45) Date of Patent: Mar. 2, 2021

(54) DOOR/WINDOW WITH INTEGRATED POWER DELIVERY SYSTEM

(71) Applicant: TYCO ELECTRONICS (SHANGHAI) CO., LTD., Shanghai (CN)

(72) Inventors: Mohammad Siddique Ahmed, Mechanicsburg, PA (US); Yuming Song, Shanghai (CN)

(73) Assignees: TYCO ELECTRONICS (SHANGHAI) CO., LTD., Shanghai (CN); TE CONNECTIVITY SERVICES GmbH, Schaffhausen (CH)

( * ) Notice: Subject to any disclaimer, the term of this patent is extended or adjusted under 35 U.S.C. 154(b) by 89 days.

(21) Appl. No.: 15/993,782

(22) Filed: May 31, 2018

(65) Prior Publication Data
US 2019/0280531 A1     Sep. 12, 2019

(30) Foreign Application Priority Data
Mar. 9, 2018 (CN) .......................... 201810198336.1

(51) Int. Cl.
*E06B 7/28* (2006.01)
*G07C 9/00* (2020.01)
*H02J 50/40* (2016.01)
*H02J 50/80* (2016.01)
*G07C 9/30* (2020.01)

(52) U.S. Cl.
CPC .............. *H02J 50/40* (2016.02); *E06B 7/28* (2013.01); *G07C 9/00182* (2013.01); *G07C 9/30* (2020.01); *H02J 50/80* (2016.02); *G07C 2009/00634* (2013.01)

(58) Field of Classification Search
USPC ............................................ 307/31
See application file for complete search history.

(56) References Cited

U.S. PATENT DOCUMENTS

| 8,337,039 B1 * | 12/2012 | Larkin ................. F21V 33/006 |
| | | 136/244 |
| 8,354,914 B2 | 1/2013 | Buckingham et al. |
| 8,772,970 B2 | 7/2014 | Lambrou |

(Continued)

FOREIGN PATENT DOCUMENTS

| CN | 200968110 Y | 10/2007 |
| CN | 203925102 U | 11/2014 |

(Continued)

OTHER PUBLICATIONS

European Search Report, dated Jul. 18, 2019, EP 19 16 0629, Application No. 19160629.2-1206.

*Primary Examiner* — Rexford N Barnie
*Assistant Examiner* — Xuan Ly

(57) ABSTRACT

An electrified door or window system having a frame with a power transmitting device and a door or window having a power receiving device. The power receiving device is electrically connected to the power transmitting device in the frame of the door or window. At least one powered device is integrated in the door or window. At least one electrically conductive pathway extends from the power receiving device to the at least one powered device. A controller is provided to control the flow of power from the power receiving device to the at least one electrically conductive pathway.

19 Claims, 3 Drawing Sheets

(56) References Cited

U.S. PATENT DOCUMENTS

| | | |
|---|---|---|
| 9,290,966 B2 | 3/2016 | Hanchett, Jr. |
| 9,652,917 B2 | 5/2017 | Johnson et al. |
| 2014/0020295 A1 | 1/2014 | Bonahoom et al. |
| 2014/0267739 A1 | 9/2014 | Ibsies |
| 2016/0163139 A1 | 6/2016 | Kankkunen et al. |
| 2016/0322847 A1* | 11/2016 | Geiszler ............... H04B 5/0093 |
| 2017/0040827 A1* | 2/2017 | Weber .................... H02J 50/10 |

FOREIGN PATENT DOCUMENTS

| | | |
|---|---|---|
| CN | 205117039 U | 3/2016 |
| WO | 2013/163124 A1 | 10/2013 |
| WO | 2016/032464 A1 | 3/2016 |
| WO | 2016/175910 A1 | 11/2016 |
| WO | 2017/024088 A1 | 2/2017 |

\* cited by examiner

DOOR/WINDOW WITH INTEGRATED POWER DELIVERY SYSTEM

FIELD OF THE INVENTION

The invention is directed to a door or window with an integrated power delivery system. In particular, the invention is directed to a door or window which can accommodate power devices which are integrated in the door or window.

BACKGROUND OF THE INVENTION

Demand for connectivity in the buildings and home space continues to grow as occupants and owner require additional security, comfort and ease of use. However, many door and windows used in the buildings and home space use technology that has been in existence for many years, making it difficult to incorporate electronic devices with security, comfort and ease of use therein. For example, if a home owner wanted to add connectivity to the doors and windows of a home, the solution is to retrofit these doors and windows with current sensors, smart door locks and door bells. If the security system needed to be installed, additional retrofit sensors are required on the door or window to sense the opening and closing of the door or window. These retrofit devices can be easily tampered with or disabled by intruders and/or unauthorized individuals as the retrofit devices are exposed because they are not integrated into any structure. In addition, the retrofit devices are often powered by batteries, as the retrofit devices are often installed in areas in which power is not easily accessible.

It would, therefore, be beneficial to provide a door or window with integrated power and an integrated power delivery system to allow for electrified devices to be installed and integrated therein.

SUMMARY OF THE INVENTION

An object is to provide a door or window with integrated power to allow for electrified devices to be installed and integrated therein.

An object is to provide a door or window with an integrated power delivery system to allow for electrified devices to be installed and integrated therein.

An embodiment is directed to an electrified door or window system having a frame with a power transmitting device and a door or window having a power receiving device. The power receiving device is electrically connected to the power transmitting device in the frame of the door or window. At least one powered device is integrated in the door or window. At least one electrically conductive pathway extends from the power receiving device to the at least one powered device. A controller is provided to control the flow of power from the power receiving device to the at least one electrically conductive pathway.

An embodiment is directed to an electrified door or window system having a frame with a power transmitting device and a door or window having a power receiving device. The power receiving device is electrically connected to the power transmitting device in the frame of the door or window. At least one powered device is integrated in the door or window. An electrically conductive bus bar extends from the power receiving device to the at least one powered device. A controller is provided to control the flow of power from the power receiving device to the conductive bus bar.

An embodiment is directed to an electrified door or window system having a frame with a power transmitting device and a door or window having a power receiving device. The power receiving device is electrically connected to the power transmitting device in the frame of the door or window. A plurality of powered devices are integrated in the door or window. An electrically conductive bus bar extends from the power receiving device to the plurality of powered devices. A controller is provided to control the flow of power from the power receiving device to the conductive bus bar. At least one powered device transmits data to a remote device which is remote from the electrified door or window system.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
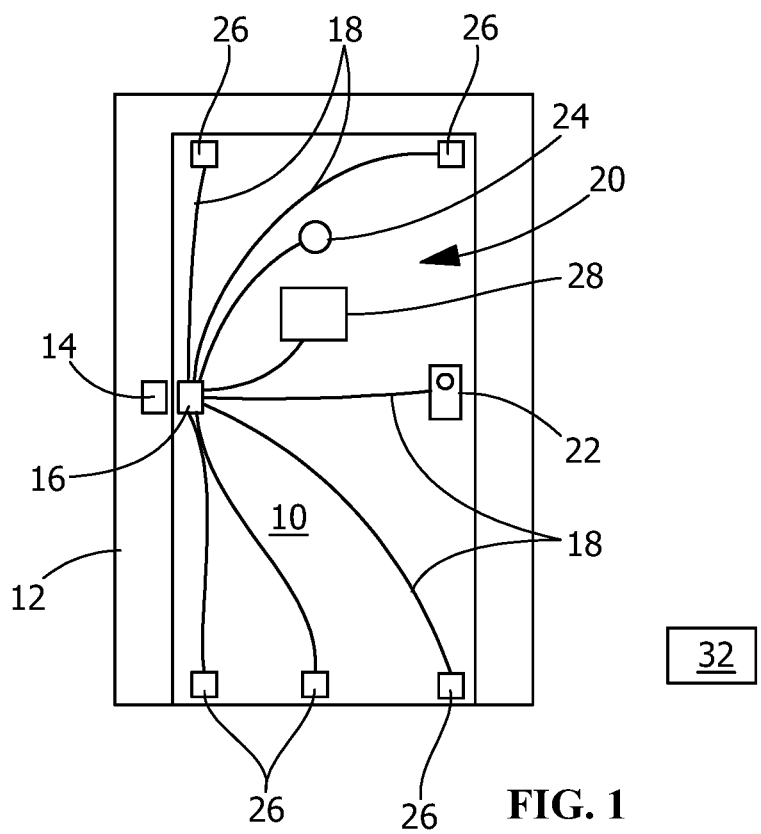
FIG. 1 is a diagrammatic view of a door and door frame with a first illustrative embodiment of an integrated power delivery system of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Figure 2:
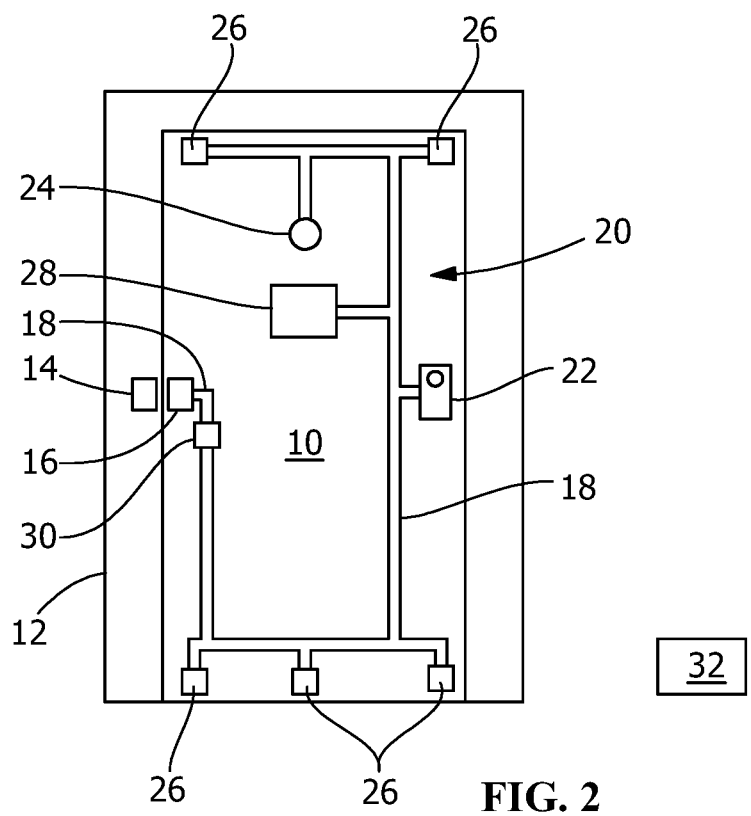
FIG. 2 is a diagrammatic view of a door and door frame with a second illustrative embodiment of an integrated power delivery system of the present invention.
Figure 3:
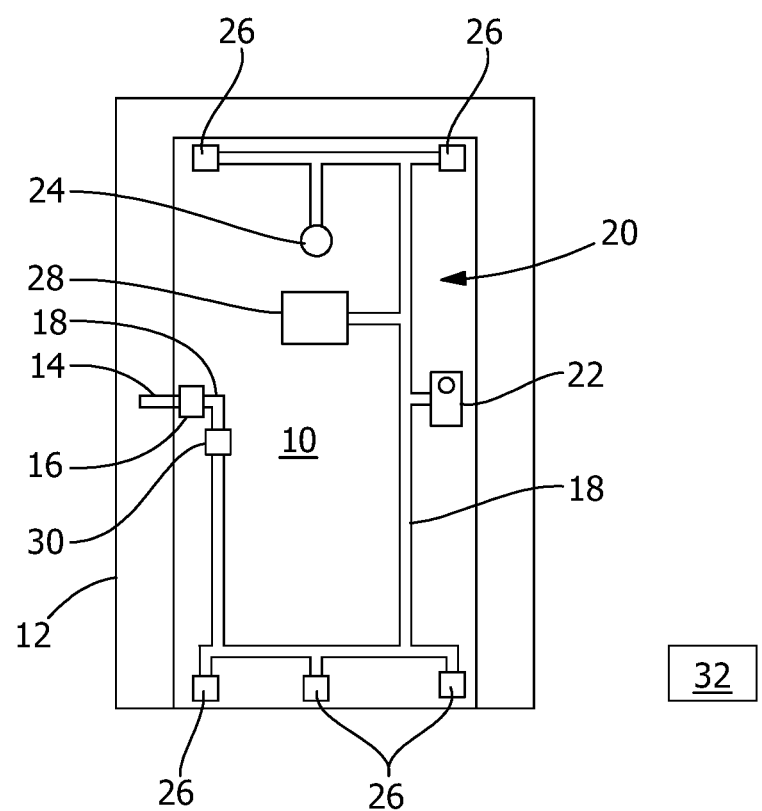
FIG. 3 is a diagrammatic view of a door and door frame with a third illustrative embodiment of an integrated power delivery system of the present invention.

Referring to FIGS. 1 through 3, an illustrative embodiment of an electrified door 10 and electrified door jamb or frame 12 with an integrated power delivery system 20 are shown. The door 10 may be made from metal, wood or other material having the strength characteristics required. In the illustrative embodiment, the door 10 has a hollow portion or passageway in which electrically conductive pathway(s) 18 may be positioned.

The door frame 12 has a power transmitting device 14 located therein. The power transmitting device 14 is connected to a power source in the building or structure. Such power source may include, but is not limited to, the electrical wiring system of the structure. In the illustrative embodiments shown in FIGS. 1 and 2, the power transmitting device 14 is a contactless power transmitting device. Such contactless power transmitting devices, include, but are not limited to, the type of devices shown in U.S. Pat. Nos. 4,140,357 and 9,520,227. In the illustrative embodiment shown in FIG. 3, the power transmitting device 14 is a wired power transmitting device. Such wired power transmitting devices include, but are not limited to, a flexible cable. In addition to transmitting power, the power transmitting device 14 may also act as a data link.

Referring again to FIGS. 1 through 3, the door 10 has a power receiving device 16 located therein. The power receiving device 16 is connected to one or more electrically conductive pathway(s) 18 which are positioned in an interior space of the door 10. The electrically conductive pathway(s) 18 may include, but are not limited to, discrete conductive wires or fibers, as shown in FIG. 1, or a conductive bus bar, as shown in FIGS. 2 and 3.

In the illustrative embodiments shown in FIGS. 1 and 2, the power receiving device 16 is a contactless power receiving device. Such contactless power receiving devices, include, but are not limited to, the type of devices shown in U.S. Pat. Nos. 4,140,357 and 9,520,227, which are hereby incorporate by reference in their entirety. In various embodiments, the contactless power receiving devices 16 and the power transmitting device 14 cooperate to provide a hinge for supporting the pivotal door 10 in relation to the door jamb or frame 12 and incorporate a structure therein which facilitates reception and passage of one or more electrical conductors in the form of insulated electrical wires in a manner in which the wires are continuous and unbroken through the power transmitting device 14 and the contactless power receiving devices 16 and are maintained in a completely concealed relation and effectively protected from tampering.

In the illustrative embodiment shown in FIG. 3, the power receiving device 16 is a wired power receiving device. Such wired power receiving devices include, but are not limited to, a flexible cable. In addition to receiving power, the power receiving device 16 may also act as a data link.

As shown in FIGS. 1 through 3, the door may include one or more electrical or powered devices which are positioned on or integrated into the door 10. An electrical or powered device is a device which requires power to operate. Powered devices for use with the door may include, but are not limited to, powered door locks 22, cameras 24, sensors 26 and displays 28. Other types of powered devices which are not shown include, but are not limited to, lighting, speakers and microphones.

In the illustrative embodiments, the powered door locks 22 are of the type which operate from data received and transmitted to a remote location or device, such as, but not limited to, a personal mobile device or phone. However, other types of powered door locks 22 may be used with the integrated power delivery system 20.

In the illustrative embodiments, the cameras or viewers 24 are of the type which include an image sensor for picking up image signals and an image processing circuit for processing image signals received from the image sensor into digital image signals. However, other types of cameras or viewers 24 may be used with the integrated power delivery system 20.

In the illustrative embodiments, the sensors 26 are of the type which detect and monitor different characteristics, such as, but not limited to temperature, light, proximity and/or motion. In addition, the sensors 26 may be used in security systems to monitor the position of the door 10. However, other types of sensors 26, such as, but not limited to, switch based sensors, may be used with the integrated power delivery system 20.

In the illustrative embodiments, the displays 28 are of the type which provide data to the operator or user, such as, but not limited to, a liquid crystal display screen or a light emitting diode screen. However, other types of displays 28 may be used with the integrated power delivery system 20, including, but not limited to other types of human machine interfaces.

A controller 30 may be provided in the integrated power delivery system 20. The controller 30 transmits data received from the powered devices to a remote device 32 which is remote from the integrated power delivery system 20. The controller 30 also receives data from the remote device 32 and processes the received data to properly operate the powered devices of the door 10. The communication between the controller 30 and the remote device 32 is done wirelessly or using other known methods. In the embodiment shown, the controller is housed in or proximate to the power receiving device 16.

Figure 4:
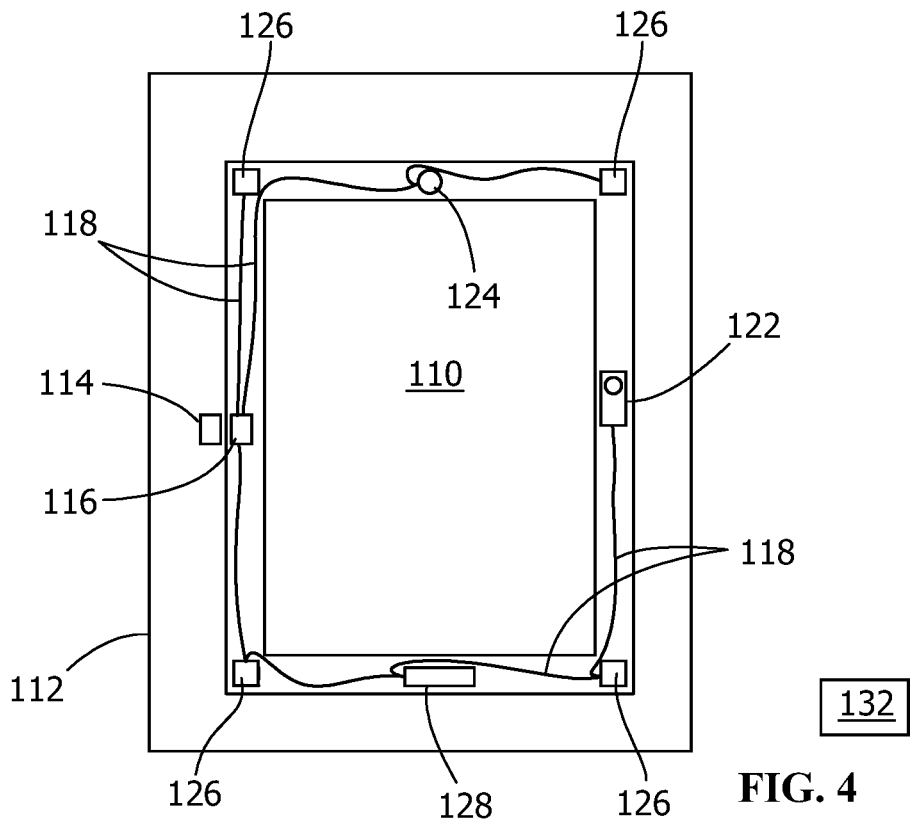
FIG. 4 is a diagrammatic view of a window and window frame with a fourth illustrative embodiment of an integrated power delivery system of the present invention.
Figure 5:
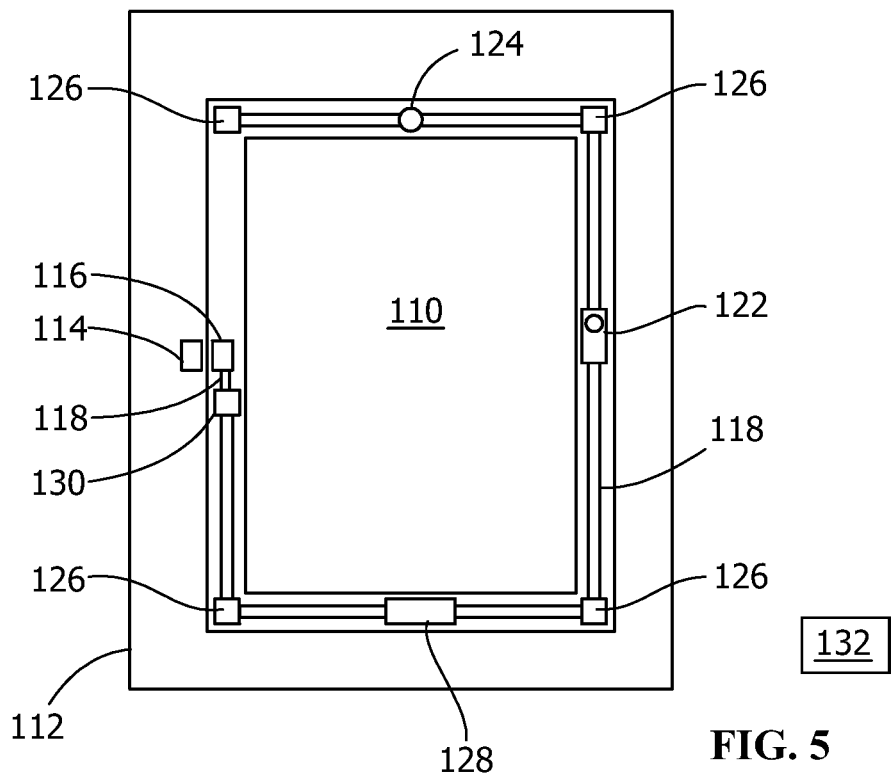
FIG. 5 is a diagrammatic view of a window and window frame with a fifth illustrative embodiment of an integrated power delivery system of the present invention.

Referring to FIGS. 4 and 5, an illustrative embodiment of an electrified window 110 and electrified window frame 112 with an integrated power delivery system 120 are shown. The window 110 may be made from metal, wood or other material having the strength characteristics required. In the illustrative embodiment, the window 110 has a hollow portion or passageway in which electrically conductive pathway(s) 118 may be positioned.

The window frame 112 has a power transmitting device 114 located therein. Position of the power transmitting device 114 may be anywhere on the frame of the window. The power transmitting device 114 is connected to a power source in the building or structure. Such power source may include, but is not limited to, the electrical wiring system of the structure. In the illustrative embodiment shown in FIG. 4, the power transmitting device 114 is a contactless power transmitting device. For a casement window, such contactless power transmitting devices, include, but are not limited to, the type of devices shown in U.S. Pat. Nos. 4,140,357 and 9,520,227. For double-hung windows, the power transmitting device may be conductors that are positioned in a track of the window frame. In addition to transmitting power, the power transmitting device 114 may also act as a data link.

Referring again to FIGS. 4 and 5, the window 110 has a power receiving device 116 located therein. The power receiving device 116 is connected to one or more electrically conductive pathway(s) 118 which are positioned in an interior space of the window 110. The electrically conductive pathway(s) 118 may include, but are not limited to, discrete conductive wires or fibers, as shown in FIG. 4, or a conductive bus bar, as shown in FIG. 5.

In the illustrative embodiments shown in FIGS. 4 and 5, the power receiving device 116 is a contactless power receiving device. Such contactless power receiving devices, include, but are not limited to, the type of devices shown in U.S. Pat. Nos. 4,140,357 and 9,520,227, which are hereby incorporate by reference in their entirety. In various embodiments, the contactless power receiving devices 116 and the power transmitting device 114 cooperate to provide a hinge for supporting the pivotal casement window 110 in relation to the window frame 112 and incorporate a structure therein which facilitates reception and passage of one or more electrical conductors in the form of insulated electrical wires in a manner in which the wires are continuous and unbroken through the power transmitting device 114 and the contactless power receiving devices 116 and are maintained in a completely concealed relation and effectively protected from tampering. In other embodiments, the power receiving devices 116 may include connectors which make contact with the conductors provided in the window frame 112 of the double-hung window. In addition to receiving power, the power receiving device 116 may also act as a data link.

As shown in FIGS. 4 and 5, the window 110 may include one or more electrical or powered devices which are positioned on or integrated into the window 110. Powered devices for use with the window may include, but are not limited to, powered window locks 122, cameras 124, sensors 126 and displays 128. Other types of powered devices which are not shown include, but are not limited to, lighting, speakers and microphones.

In the illustrative embodiments, the powered window locks 122 are of the type which operate from data received and transmitted to a remote location or device, such as, but not limited to, a personal mobile device or phone. However, other types of powered window locks 122 may be used with the integrated power delivery system 120.

In the illustrative embodiments, the cameras or viewers 124 are of the type which include an image sensor for picking up image signals and an image processing circuit for processing image signals received from the image sensor into digital image signals. However, other types of cameras or viewers 124 may be used with the integrated power delivery system 120.

In the illustrative embodiments, the sensors 126 are of the type which detect and monitor different characteristics, such as, but not limited to, temperature, light, proximity and/or motion. In addition, the sensors 126 may be used in security systems to monitor the position of the window 110. However, other types of sensors 126, such as, but not limited to, switch based sensors, may be used with the integrated power delivery system 120.

In the illustrative embodiments, the displays 128 are of the type which provide data to the operator or user, such as, but not limited to, a liquid crystal display screen or a light emitting diode screen. However, other types of displays 128 may be used with the integrated power delivery system 120, including, but not limited to other types of human machine interfaces.

A controller 130 may be provided in the integrated power delivery system 120. The controller 130 transmits data received from the powered devices to a remote device 132 which is remote from the integrated power delivery system 120. The controller 130 also receives data from the remote device 132 and processes the received data to properly operate the powered devices of the window 110. The communication between the controller 130 and the remote device 132 is done wirelessly or using other known methods. In the embodiment shown, the controller is housed in or proximate to the power receiving device 116.

The integrated power delivery system 20,120 provides a door 10 or window 110 to allow electronic devices to be powered from inside the door or the window. This allows the electronic devices to be integrated into the door, either when the door or window is manufactured or on sight as features are added. As the conductors and connections to the electronic devices are integrated into the door, the electronic devices are more tamper-resistant or tamper-proof than electronic devices that are currently installed on the surfaces of the doors, windows or structures. The integrated power delivery system eliminates the need for separate power sources (i.e. batteries) for each device. The integrated power delivery system also is compatible with and can be monitored and controlled by building management system (BMS) or by an individual, whether the BMS or individual is located on site or remote from the site.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrified door or window system comprising:
    a frame having a power transmitting device;
    a door or window having a power receiving device, the power receiving device being electrically connected to the power transmitting device in the frame of the door or window;
    multiple powered devices integrated in the door or window at multiple locations in the door or window which are spaced apart from each other;
    at least one electrically conductive pathway integrated in the door or window extending from the power receiving device to the multiple powered devices; and
    a controller integrated in the door or window, the controller provided in engagement with the at least one electrically conductive pathway, the controller transmits data received from the multiple powered devices to a device remote from the door or window, the controller receives data from the device remote from the door or window and processes the received data to properly operate the multiple powered devices integrated in the door or window at multiple locations.

2. The electrified door or window system as recited in claim 1, wherein the power transmitting device and the power receiving device are contactless devices.

3. The electrified door or window system as recited in claim 1, wherein the power transmitting device and the power receiving device are wired devices.

4. The electrified door or window system as recited in claim 1, wherein the at least one electrically conductive pathway is a discrete electrical wire which extends from the power receiving device to the multiple powered devices.

5. The electrified door or window system as recited in claim 1, wherein the at least one electrically conductive pathway is an electric bus bar which extends from the power receiving device to the multiple powered devices.

6. The electrified door or window system as recited in claim 1, wherein the controller transmits data from the multiple powered devices to a device which is remote from the electrified door or window system.

7. The electrified door or window system as recited in claim 6, wherein the multiple powered devices wirelessly transmits data to a remote device which is remote from the electrified door or window system.

8. The electrified door or window system as recited in claim 1, wherein at least one powered device of the multiple powered devices is a camera.

9. The electrified door or window system as recited in claim 1, wherein at least one powered device of the multiple powered devices is a sensor.

10. The electrified door or window system as recited in claim 1, wherein at least one powered device of the multiple powered devices is a sensor for a security system.

11. The electrified door or window system as recited in claim 1, wherein at least one powered device of the multiple powered devices is a door lock.

12. The electrified door or window system as recited in claim 1, wherein at least one powered device of the multiple powered devices is a visual display.

13. An electrified door or window system comprising:
a frame having a power transmitting device;
a door or window having a power receiving device, the power receiving device being electrically connected to the power transmitting device in the frame of the door or window;
multiple powered devices integrated in the door or window at multiple locations;
an electrically conductive bus bar extending from the power receiving device to the multiple powered devices; and
a controller integrated in the door or window, the controller provided in engagement with the at least one electrically conductive pathway, the controller transmits data received from the multiple powered devices to a device remote from the door or window, the controller receives data from the device remote from the door or window and processes the received data to properly operate the multiple powered devices integrated in the door or window at multiple locations.

14. The electrified door or window system as recited in claim 13, wherein the multiple powered devices includes one or more cameras, sensors, door locks or visual displays.

15. The electrified door or window system as recited in claim 13, wherein the power transmitting device and the power receiving device are contactless devices.

16. The electrified door or window system as recited in claim 13, wherein the power transmitting device and the power receiving device are wired devices.

17. The electrified door or window system as recited in claim 13, wherein the controller transmits data from the multiple powered devices to a device which is remote from the electrified door or window system.

18. The electrified door or window system as recited in claim 17, wherein the multiple powered devices wirelessly transmits data to a device which is remote from the electrified door or window system.

19. An electrified door or window system comprising:
a frame having a hollow portion and a contactless power transmitting device;
a door or window having a contactless power receiving device, the contactless power receiving device being electrically connected to the contactless power transmitting device in the frame of the door or window;
a plurality of powered devices integrated in the door or window at multiple locations;
an electrically conductive bus bar positioned in the hollow portion of the frame, the electrically conductive bus bar extending between the contactless power receiving device to the plurality of powered devices; and
a controller integrated in the door or window, the controller controls the flow of power from the contactless power receiving device to the plurality of powered devices over the electrically conductive bus bar, the controller transmits data received from the plurality of powered devices to a device remote from the door or window, the controller receives data from the device remote from the door or window and processes the received data to properly operate the plurality of powered devices integrated in the door or window at multiple locations.

* * * * *